(12) United States Patent
Toncelli

(10) Patent No.: US 9,579,821 B2
(45) Date of Patent: Feb. 28, 2017

(54) APPARATUS AND METHOD FOR MANUFACTURING SLABS WITH A VEINED EFFECT

(76) Inventor: Luca Toncelli, Bassano del Grappa (IT)

( * ) Notice: Subject to any disclaimer, the term of this patent is extended or adjusted under 35 U.S.C. 154(b) by 860 days.

(21) Appl. No.: 13/255,384

(22) PCT Filed: Mar. 9, 2010

(86) PCT No.: PCT/IB2010/050998
§ 371 (c)(1),
(2), (4) Date: Sep. 8, 2011

(87) PCT Pub. No.: WO2010/103456
PCT Pub. Date: Sep. 16, 2010

(65) Prior Publication Data
US 2011/0318483 A1 Dec. 29, 2011

(30) Foreign Application Priority Data
Mar. 10, 2009 (IT) .............................. TV2009A0036

(51) Int. Cl.
*B05C 1/00* (2006.01)
*B05C 11/02* (2006.01)
(Continued)

(52) U.S. Cl.
CPC ............ *B28B 13/027* (2013.01); *B01F 3/184* (2013.01); *B01F 7/00583* (2013.01); *B01F 13/0013* (2013.01); *B05C 19/04* (2013.01); *B05C 19/06* (2013.01); *B05D 1/30* (2013.01); *B28B 1/005* (2013.01); *B28B 13/0215* (2013.01);
(Continued)

(58) Field of Classification Search
None
See application file for complete search history.

(56) References Cited

U.S. PATENT DOCUMENTS 1,448,203 A * 3/1923 Cumfer .................... D06B 3/10
118/301
2,098,246 A * 11/1937 Jarrier .......................... 222/238
(Continued)

FOREIGN PATENT DOCUMENTS

| CN | 1522987 | 8/2004 |
| CN | 2784164 | 5/2006 |

(Continued)

OTHER PUBLICATIONS

Abdullah, Mohd Mustafa Al Bakri, et al. "Concrete Ceramic Waste Slab (CCWS)." (2006). Published in Journal of Engineering Research and Education, vol. 3, 2006, pp. 139-145 available at http://dspace.unimap.edu.my/dspace/handle/123456789/2032.
(Continued)

*Primary Examiner* — Binu Thomas
(74) *Attorney, Agent, or Firm* — Fredrikson & Byron, P.A.

(57) ABSTRACT

Means for dispensing a powdery coloring substance onto the surface of a mix comprising stone, stone-like, glass or ceramic material. The means comprise at least one dispensing device for containing and dispensing a powdery coloring substance and at least one spreading device. The spreading device comprises at least one moving perforated plate which receives a metered amount of said coloring substance from the dispensing device and distributes it over the surface of the mix.

20 Claims, 13 Drawing Sheets

(51) Int. Cl.

| | | |
|---|---|---|
| *B28B 13/02* | (2006.01) | |
| *B28B 5/02* | (2006.01) | |
| *B05D 1/02* | (2006.01) | |
| *B05D 5/00* | (2006.01) | |
| *B29B 7/00* | (2006.01) | |
| *B05D 1/30* | (2006.01) | |
| *B05C 19/06* | (2006.01) | |
| *B05C 19/04* | (2006.01) | |
| *B28B 1/00* | (2006.01) | |
| *B01F 3/18* | (2006.01) | |
| *B44F 9/04* | (2006.01) | |
| *B01F 7/00* | (2006.01) | |
| *B01F 13/00* | (2006.01) | |
| *B05B 7/14* | (2006.01) | |
| *B05B 5/16* | (2006.01) | |

(52) U.S. Cl.
CPC ............ *B29B 7/007* (2013.01); *B44F 9/04* (2013.01); *B05B 5/1683* (2013.01); *B05B 7/144* (2013.01)

(56) References Cited

U.S. PATENT DOCUMENTS

| | | | | |
|---|---|---|---|---|
| 2,200,773 | A * | 5/1940 | Von Straten Finne | 222/614 |
| 2,323,864 | A * | 7/1943 | Weyandt | 222/41 |
| 3,426,730 | A * | 2/1969 | Ascough et al. | 118/636 |
| 3,663,137 | A * | 5/1972 | Haas et al. | 425/148 |
| 3,953,623 | A * | 4/1976 | Das | 427/559 |
| 4,557,882 | A * | 12/1985 | Arnold | 264/40.4 |
| 4,569,920 | A | 2/1986 | Smith-Johannsen | |
| 4,617,060 | A | 10/1986 | Dreibelbis | |
| 4,698,010 | A | 10/1987 | Toncelli | |
| 4,783,435 | A | 11/1988 | Dreibelbis | |
| 4,937,394 | A | 6/1990 | Dreibelbis | |
| 5,013,523 | A | 5/1991 | Hata | |
| 5,031,546 | A * | 7/1991 | Amos et al. | 105/248 |
| 5,174,823 | A | 12/1992 | Dario | |
| 5,264,168 | A | 11/1993 | Toncelli | |
| 5,314,090 | A * | 5/1994 | Alexander | 222/1 |
| 5,469,971 | A * | 11/1995 | Chilton et al. | 209/235 |
| 5,477,307 | A * | 12/1995 | Bergen et al. | 222/200 |
| 5,514,399 | A * | 5/1996 | Cordera et al. | 426/295 |
| 5,820,802 | A * | 10/1998 | Oberoi | 264/145 |
| 5,914,187 | A | 6/1999 | Naruse | |
| 5,922,254 | A * | 7/1999 | Ebert et al. | 264/40.1 |
| 5,942,205 | A | 8/1999 | Murata | |
| 6,387,307 | B1 * | 5/2002 | Bossetti | 425/447 |
| 6,461,552 | B1 | 10/2002 | Geiger | |
| 6,713,015 | B1 | 3/2004 | Toncelli | |
| 7,487,892 | B1 * | 2/2009 | Hirsch | 222/240 |
| 7,550,026 | B2 | 6/2009 | Hayakawa | |
| 7,550,106 | B2 | 6/2009 | Toncelli | |
| 7,819,346 | B2 * | 10/2010 | Perkes | 239/662 |
| 2004/0032044 | A1 | 2/2004 | Toncelli | |
| 2005/0147806 | A1 | 7/2005 | Toncelli | |
| 2005/0238752 | A1 * | 10/2005 | Toncelli | 425/447 |
| 2008/0079185 | A1 | 4/2008 | Jamrussamee | |
| 2008/0187742 | A1 | 8/2008 | Toncelli | |
| 2008/0280750 | A1 | 11/2008 | Liu | |
| 2009/0101790 | A1 * | 4/2009 | Toncelli | 249/55 |
| 2010/0052225 | A1 | 3/2010 | Toncelli | |
| 2010/0194005 | A1 * | 8/2010 | Toncelli | 425/104 |
| 2011/0003366 | A1 * | 1/2011 | Zeikus | 435/243 |

FOREIGN PATENT DOCUMENTS

| | | | |
|---|---|---|---|
| EP | 0378275 | | 7/1990 |
| EP | 0962294 | A2 | 5/1999 |
| EP | 1510314 | A2 | 3/2005 |
| EP | 1787779 | | 5/2007 |
| GB | 2310161 | A | 8/1997 |
| IT | 1242777 | | 5/1994 |
| IT | TV940091 | A1 | 1/1996 |
| IT | 1293176 | | 2/1999 |
| JP | 57194034 | A | 11/1982 |
| JP | 01043336 | A | 2/1989 |
| JP | 2002348722 | A * | 12/2002 |
| RU | 2283818 | | 7/2006 |
| WO | 9615888 | A1 | 5/1996 |
| WO | 9846543 | | 10/1998 |
| WO | 0117741 | | 3/2001 |
| WO | 03027042 | | 4/2003 |
| WO | 2004022295 | | 3/2004 |
| WO | 2004039547 | A1 | 5/2004 |
| WO | 2006045728 | A1 | 5/2006 |
| WO | 2006048438 | A1 | 5/2006 |
| WO | 2006122892 | | 11/2006 |
| WO | 2007009860 | A1 | 1/2007 |
| WO | 2009010406 | A2 | 1/2009 |

OTHER PUBLICATIONS

PCT International Search Report dated Mar. 17, 2009 for PCT/IB2008/050966, from which the instant application is based, 3 pgs.

PCT Written Opinion dated Mar. 17, 2009 for PCT/IB2008/050966, from which the instant application is based, 4 pgs.

PCT International Search Report dated Feb. 3, 2009 for PCT/EP2008/058682, from which the instant application is based, 4 pgs.

PCT Written Opinion dated Feb. 3, 2009 for PCT/EP2008/058682, from which the instant application is based, 8 pgs.

PCT International Preliminary Report on Patentability dated Sep. 16, 2009 for PCT/EP2008/058682, from which the instant application is based, 11 pgs.

"PCT International Search Report dated Jun. 11, 2010 for PCT/I132010/050998, from which the instant application is based," 4 pgs.

"PCT Written Opinion dated Jun. 11, 2010 for PCT/IB2010/050998, from which the instant application is based," 7 pgs.

English-language abstract for CN2784164 (Yang).

* cited by examiner

APPARATUS AND METHOD FOR MANUFACTURING SLABS WITH A VEINED EFFECT

RELATED APPLICATIONS

This application is a 35 U.S.C. 371 national stage filing from International Application No. PCT/IB2010/050998 filed Mar. 9, 2010 and claims priority to Italian Application No. TV2009A000036 filed Mar. 10, 2009, the teachings of which are incorporated herein by reference.

FIELD OF THE INVENTION

The present invention relates to an apparatus and a method for manufacturing conglomerate stone slabs which have veining similar to that present in natural stone materials.

In particular, the invention relates to the manufacture of conglomerate stone slabs obtained from a mix of granulated stone and/or stone-like material and a binder.

BACKGROUND

Hitherto various methods for manufacturing such a material are known, including for example the so-called Bretonstone technology used to manufacture slabs.

These slabs are manufactured using a special technology which involves the preparation of a starting mix comprising a stone and/or stone-like material and a binder, together with any additives.

Generally the binder may be of an inorganic nature, such as cement, or a synthetic resin which can be hardened by means of heat and/or a catalyst.

The starting mix is normally spread over a temporary support which may be a conveyor belt or a tray-like mould.

As is known, natural stone materials (such as marble and granite, to name the most common types) normally have irregular veining, mainly with a colour which contrasts or in any case is different from the basic colour of stone.

In the Bretonstone method hitherto a colouring substance is added after the mix has been deposited on the temporary support.

Said substance is distributed on the surface of the mix in an irregular manner. Then the mix is treated using a spiking apparatus so as to ensure that the colouring agent penetrates inside the mix.

This stage is preceded by a step involving vacuum vibrocompression of the mix. During this step the mix is subject for a given period of time and at a given vacuum value to the action of a press, while a vibratory movement at a predetermined frequency is imparted to the press ram.

The rough-formed slab thus obtained then undergoes a hardening step which depends on the type of binder used.

However, this method is unable to ensure veining throughout the thickness of the slab and is therefore suitable for applications where the edge (or thickness of the article) is not visible.

In fact the action of the spiking apparatus on the mix, following distribution of the colouring agent, is able to achieve the veining effect only over a depth of a few millimeters from the surface, equal to no more than half the thickness of the finished slab.

Alternatively, it is possible to envisage the use of a weighing distributor of the type described in the international patent application WO-A-2004/039547.

According to this production method the starting mix, before being loaded inside a metering device, is subject to the action of devices which apply liquid or powder colouring pigments onto its surface.

The mix comprising the colouring agent is conveyed to the distributor and reaches it by means of a free-falling action so that it undergoes further mixing which, on the one hand, ensures shortening of the veining and, on the other hand, diffusion of the pigment within the mass of the mix which is therefore at least partly coloured en masse.

Another type of technology which is known is Lapitech technology, a term which is understood as referring in general to the technology, the associated method and the resultant slabs. Lapitech technology is used for the manufacture of slabs similar to ceramic articles intended for the internal and external cladding of buildings.

In this case also a starting mix is prepared using a granulated stone, stone-like or ceramic material, preferably in the form of sand of suitable dimensions. The granulated product is mixed with the components which are normally used for the manufacture of ceramic materials, usually in powdery form and consisting mainly of kaolin or clay. A binder, for example sodium silicate in aqueous form or silicasol is then added to the mixture so as to make the mixture moist.

The mix is then extended over a temporary support with a given thickness and then undergoes a vibrocompression step, resulting in a rough-formed slab. Subsequently the rough-formed slab thus obtained undergoes drying in order to remove the water and then firing in an oven at a temperature of about 1200° C.

This technology, as regards the veining effect obtained, is also subject to limitations and drawbacks similar to those mentioned in connection with Bretonstone technology.

The industrial patent application WO-A-2009/010406 describes a method and apparatus for manufacturing slabs with a veined effect.

The procedure and method described are applicable both to Bretonstone technology and to Lapitech technology and the apparatus used is substantially that described in the international patent application No. WO-A-2006/045728.

In the application WO-A-2009/010406 the method is substantially the same as that described above except for a step involving the non-uniform distribution of the colouring agent on the surface of the mix. The distribution of the colouring agent is performed by means of at least one dispensing device which is positioned at the downstream end of an extractor belt which forms the bottom of the apparatus, so as to dispense the colouring agent onto the surface of the layer of mix conveyed by said extractor belt towards the position where it falls freely onto said temporary moulding support.

The colouring or pigmenting agent used may be in solid form (dry powder) or liquid form and may be supplemented or replaced with coloured or reflective granules.

By means of this method it is possible to obtain slabs and articles which have a veined effect throughout their thickness.

However this method is also not without drawbacks.

Firstly, performing addition of the colouring agents before the vibrocompression step has the effect that the liquid colouring agent is diffused lightly within the mass of the mix.

This diffusion results in blurred veining which is not clear and well-defined like the veining present in natural stone.

Moreover, still with reference to the liquid colouring agent, cleaning of the plant is particularly complex since each nozzle must be disassembled and cleaned and each individual pipe supplying the colouring liquid to the nozzles must be cleaned.

The same procedure must also be performed in the case where it is required to change the veining effect to be performed on the slab, both in terms of different colouring and in terms of a different effect associated with the arrangement of the veining.

The use of the powdery colouring agent would result in a more pronounced veining, similar to that of natural stone, but considerable difficulties exist with regard to distribution of the powdery colouring agent, both in terms of the random nature of the distribution and in terms of suitable distribution of the colouring agent.

The object of the present invention is therefore to overcome the drawbacks of the prior art.

BRIEF SUMMARIES OF OBJECTS OF THE INVENTION

A first object of the present invention is to obtain a slab or article which has a pronounced and random veined effect similar to that present in natural stone.

A second object of the present invention is to obtain a veined effect throughout the thickness of the slab or the article.

A third object of the present invention is to provide an apparatus which is able to obtain a pronounced and random veined effect throughout the thickness of the slab or the article.

A further object of the present invention is to provide an apparatus in which changing of the colouring agent is facilitated so as to obtain effects of a different type on the slabs or the articles.

These and other objects according to the present invention are achieved with an apparatus and a method as defined in the claims.

BRIEF DESCRIPTIONS OF THE DRAWINGS

The further advantages and characteristic features of the present invention will become clear from the detailed description which follows of a number of examples of embodiment, provided by way of a non-limiting example, with reference to the accompanying drawings in which.

DETAILED DESCRIPTION OF EMBODIMENTS OF THE INVENTION

Figure 1:
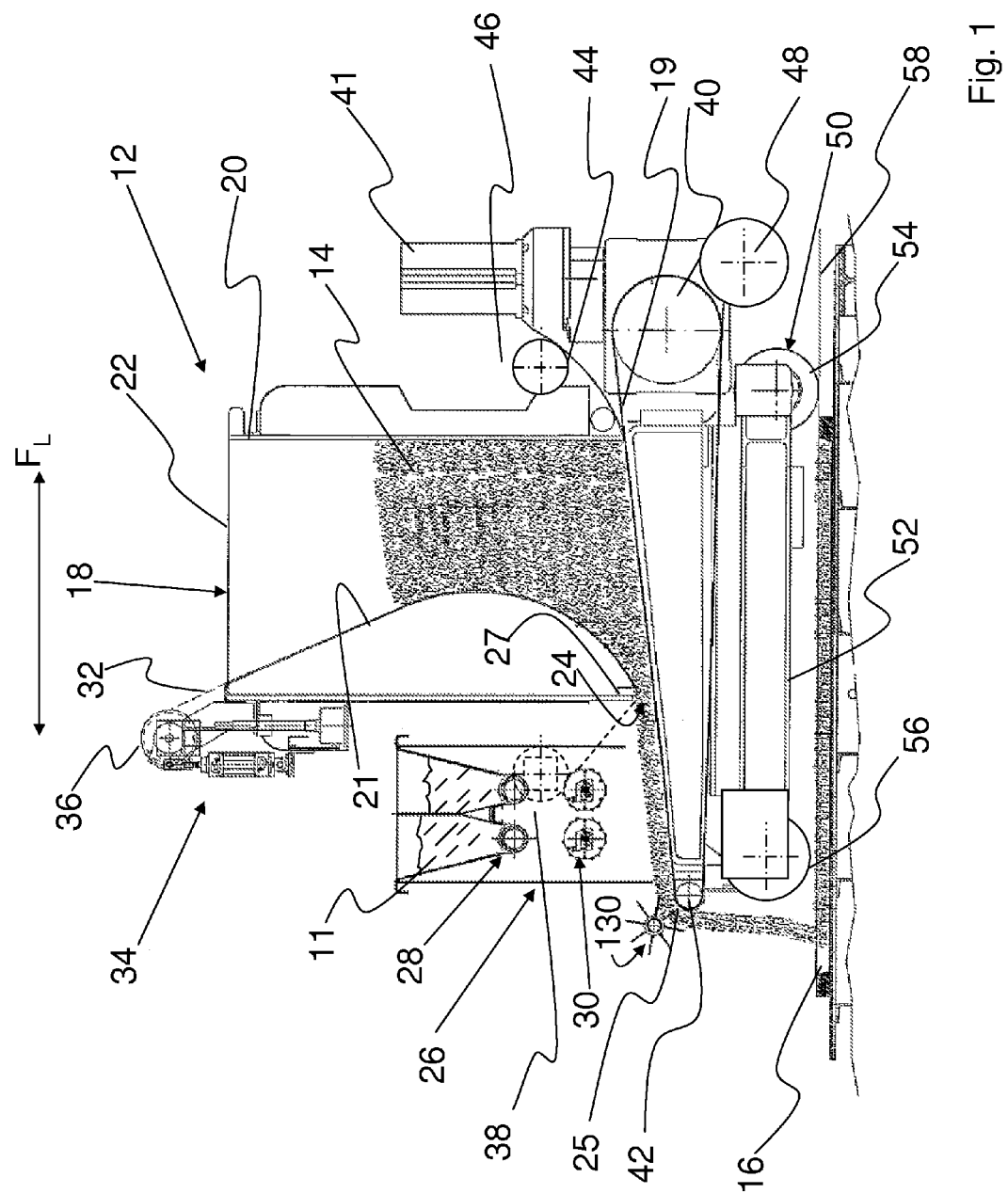
FIG. 1 shows a laterally sectioned view of a first embodiment of an apparatus for distributing the colouring agent in a plant for manufacturing conglomerate slabs according to the invention.
Figure 2:
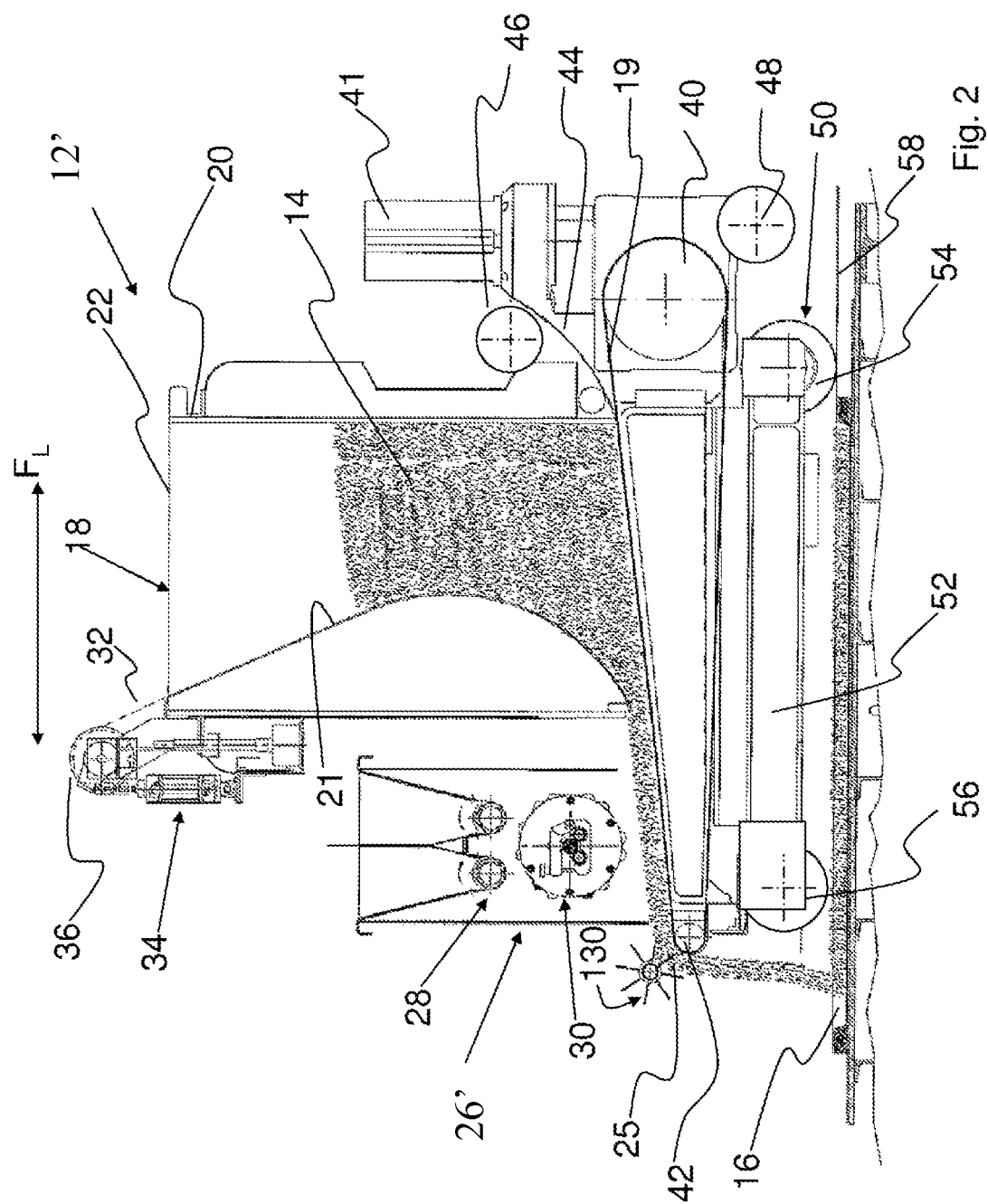
FIG. 2 shows a laterally sectioned view of a second embodiment of the apparatus for distributing the colouring agent according to the invention.
Figure 3:
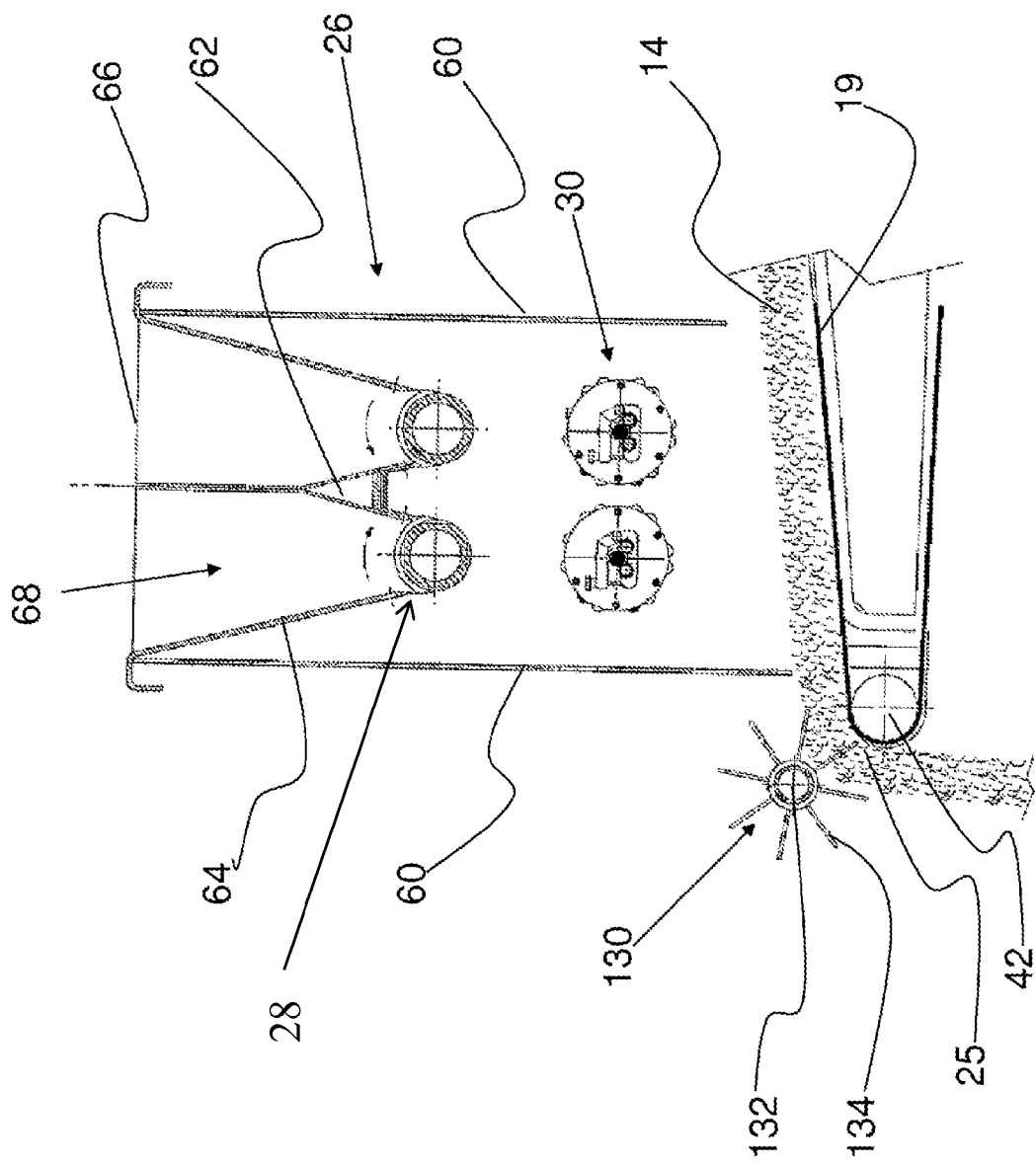
FIG. 3 shows a laterally sectioned view, on a larger scale, of means for dispensing/spreading the powdery colouring substance according to a first embodiment of the invention.

Each of FIGS. 1 and 2 shows an apparatus, denoted overall by the reference numbers 12 and 12', respectively, for distributing a mix 14 in a thin layer on a support 16 formed by a tray-like mould. Said mix 14 comprises a granulated stone, stone-like or ceramic material and/or an organic or inorganic binder.

Still with reference to FIG. 1 the following are defined:

a longitudinal direction parallel to the direction of relative movement of the apparatus 12 with respect to the support 16, denoted by the double arrow $F_L$;

a transverse direction perpendicular to the direction of relative movement of the apparatus 12 with respect to the support 16 and perpendicular to the cross-sectional plane shown in FIG. 1; and a transverse plane containing the transverse direction and perpendicular to the longitudinal direction.

The apparatus 12, 12' according to the invention comprises a mix distributor 18 which is substantially the same as that described in the patent application WO 2006/045728.

It comprises a hopper 20 with a top loading opening 22 suitable for loading the mix 14 and with a shaped wall 21 having in particular a convexity directed inwards.

The hopper 20 has a discharge opening 24 on the bottom, extending in a transverse plane perpendicular to the direction of relative movement $F_L$.

The discharge opening 24 is provided with a gate 27 for controlling the throughput of the mix 14 passing out through the discharge opening 24.

The apparatus 12, 12' according to the invention also comprises an extractor belt 19 which is positioned underneath the hopper 20 and which in particular forms the bottom thereof. The extractor belt 19 allows the mix 14 to be transferred, from the hopper 20 to the support 16 which is positioned below the extractor belt 19, by means of a free-falling action from the downstream end of the extractor belt 19.

As mentioned above, the mix distributor 18 is movable in both directions relative to the support 16 in the direction indicated by the arrow $F_L$ at a constant speed so that material is deposited on the support with the desired constant thickness.

The relative movement of the distributor 18 and the support 16 is made possible by means of motor-driven carriage structure which is shown in simplified form and indicated overall by the reference number 50.

The carriage structure 50 comprises a frame 52 to which the distributor 18 is rigidly fixed.

Said frame 52 is mounted on wheels 54, 56 which engage with coplanar rails 59 situated along the two sides of the support 16 and allow the movement of the distributor in the direction indicated by the double arrow $F_L$.

The movement of the distributor is produced in a known manner by motor means (not shown).

In one possible embodiment it is possible to envisage the arrangement of a protective film 32 between the mix 14 and the shaped wall 21 of the hopper 20, as shown in WO-A-2006/45728.

Said film 32 made of non-adhesive material has the purpose of protecting the shaped wall 21 from any depositions formed by residual amounts of the mix 14.

A film feeding system, denoted overall by the reference number 34, is provided for allowing the continuous renewal of said film and comprises a feed roller 36 around which the protective film 32 is wound.

A second reel 38, operated by an electric motor (not shown), is positioned on the outside of the hopper 20, in a position raised with respect to the bottom thereof and therefore with respect to the extractor belt 19, this reel allowing unwinding of the film 32 from the roller 36 and movement thereof in the direction from the upper opening 22 towards the discharge opening 24.

The extractor belt 19 is mounted endlessly wound around two rollers 40, 42, the roller 40 being operated by a motor 41 and the driven roller 42 performing the usual transmission function.

The direction of rotation of the rollers 40, 42 is such that the extractor belt 19 conveys the bottom layer of the mix 14 (with which it makes contact) towards the discharge opening 24 of the hopper 20, i.e. towards the downstream end 25 of the belt 19.

In one possible embodiment of the invention the upper surface of the belt 19, i.e. the surface of the belt 19 which transfers said bottom layer of the mix, is protected with a film of plastic material 44, for example consisting of polyethylene, which is unwound from a roller 46 and reaches a motor-driven receiving roller 48. In order to prevent the film 44 from being displaced off-centre with respect to the upper surface of the belt 19, the latter has a certain degree of roughness.

The upper section of the belt 19 which conveys the mix 14 has an inclination of between 10° and 20° and preferably equal to about 15° in the direction of feeding of the mix 14.

The apparatus 12, 12' comprises dispensing/spreading means for distributing a powdery colouring substance 11 having a particle size generally less than 0.5 mm on the surface of the mix, said means being denoted overall by the reference numbers 26, 26', respectively.

Said means 26, 26' comprise at least one dispensing device 28 for the powdery colouring substance 11 and also comprise at least one spreading device 30 suitable for receiving the powdery colouring substance 11 from said dispensing device 28 and for sprinkling it over the upper surface of the mix 14. In particular the colouring substance 11 may be sprinkled in a position situated between the discharge opening 24 of the hopper 18 and the downstream end of the extractor belt 19 where the mix 14 is discharged by falling onto the support 16.

Figure 4:
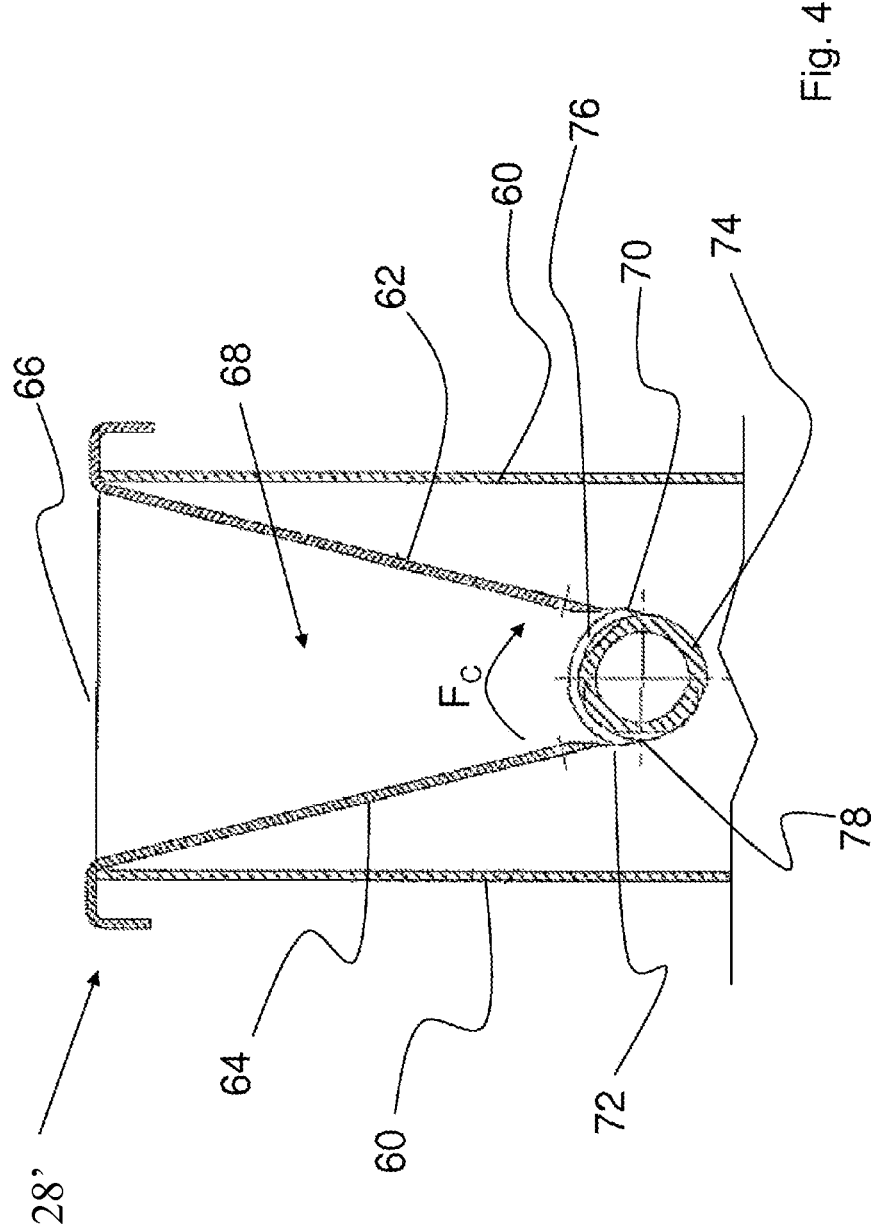
FIG. 4 shows a laterally sectioned view of a device for dispensing powdery colouring substance according to a possible embodiment of the invention.

With reference now also to FIG. 4, the dispensing device 28 comprises a support structure 60 which is rigidly fixed to the structure of the distributor 18 and supports two inclined walls 62, 64 which converge downwards, forming a prism-shaped funnel 68 with an opening 66.

The prism-shaped funnel 68 acts a storage vessel for the powdery colouring substance 11.

According to a first embodiment, flexible metal strips 70, 72 are fixed to the bottom of the inclined walls 62, 64. Said flexible strips 70, 72 may be fixed to the inclined walls 62, 64 in a rigid or removable manner.

Figure 10:
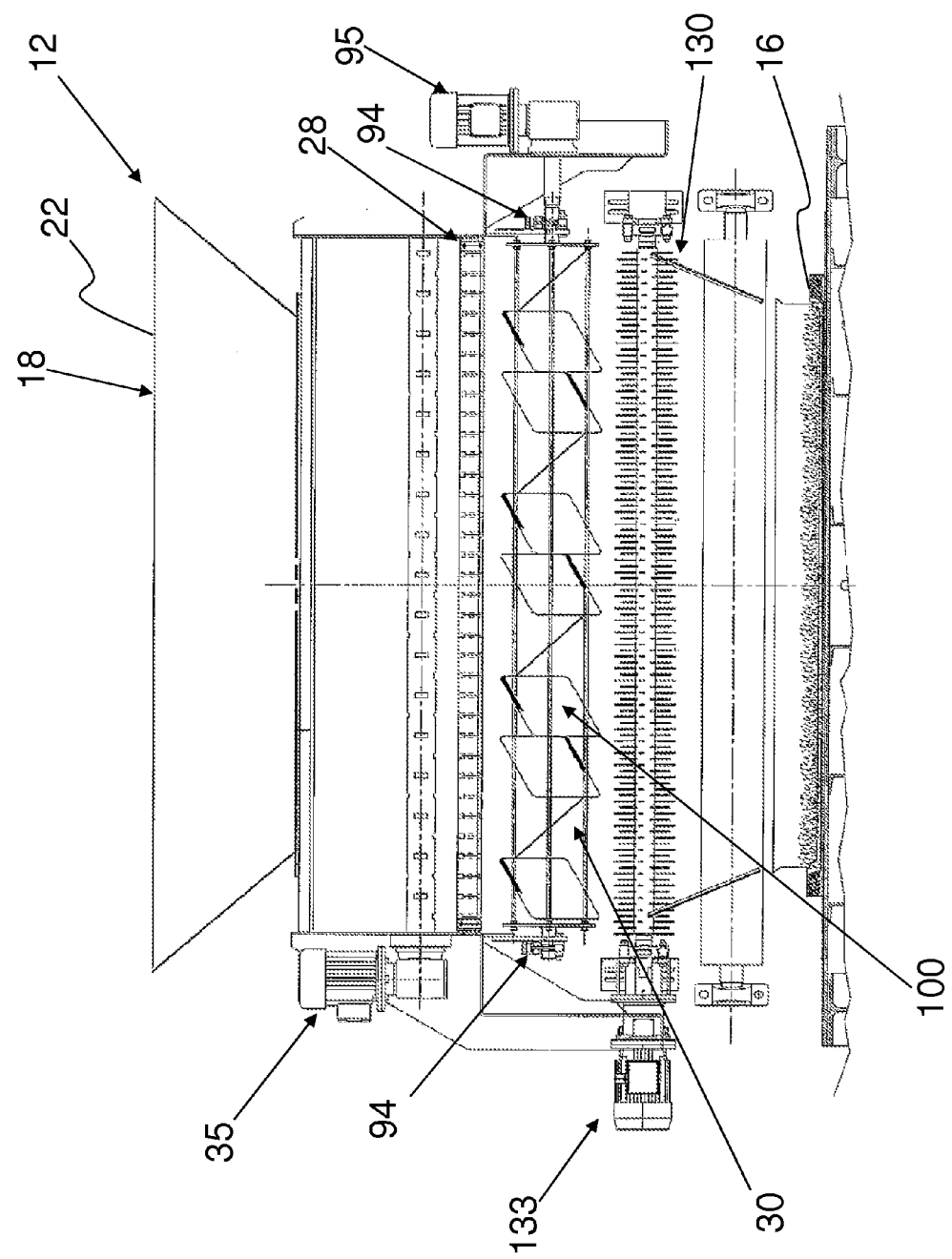
FIG. 10 shows a front view of the apparatus according to invention.

The strips 70, 72 are kept in contact via a light pressure (for example making use of their resilient nature) with a metering cylinder 74 which forms the bottom of the prism-shaped funnel 68 and is operated by a motor 35 (shown in FIG. 10) in the direction of the arrow $F_C$.

The metering cylinder 74 has its axis of rotation perpendicular to the direction $F_L$ of displacement of the distributor 18.

The surface of the cylinder 74 has, formed therein, recesses 76, 78 which are situated in non-symmetrical positions with respect to the axis of symmetry of the cylinder and in positions distributed in a non-ordered manner along the said axis.

The cylinder 74 has the form of the recesses 76, 78 which is variable in a non-ordered manner.

In particular the circumferential and longitudinal extension and the depth of the recesses 76, 78 may vary.

In other words each recess has a circumferential and longitudinal extension as well as a depth which is different and in no way related to that of the adjacent recesses on the surface of the cylinder, such that it may be described as being a random distribution.

When said recesses 76, 78 are situated in a position facing the inside of the funnel 68 they are filled and, by means of rotation of the metering cylinder 74, since they start to face downwards, they discharge their contents onto the underlying spreading device 30.

In this way the at least one dispensing device 28 distributes in a random manner the colouring substance 11 onto at least one spreading device 30.

In one possible embodiment said dispensing device 28 may envisage the use of two or more prism-shaped funnels 68, each associated with a respective metering cylinder 74.

In this way, not only is it possible to obtain a distribution of the colouring substance 11 which is even more random, but it is also possible to use several colouring substances of a different type and different colour.

Each metering cylinder 74 may be provided underneath with one or more vertical cleaning blades (not shown), made of spring steel, these being able to be inserted inside each recess 76, 78 so as to scrape off any pigment which may remain attached to the cavities.

Figure 6:
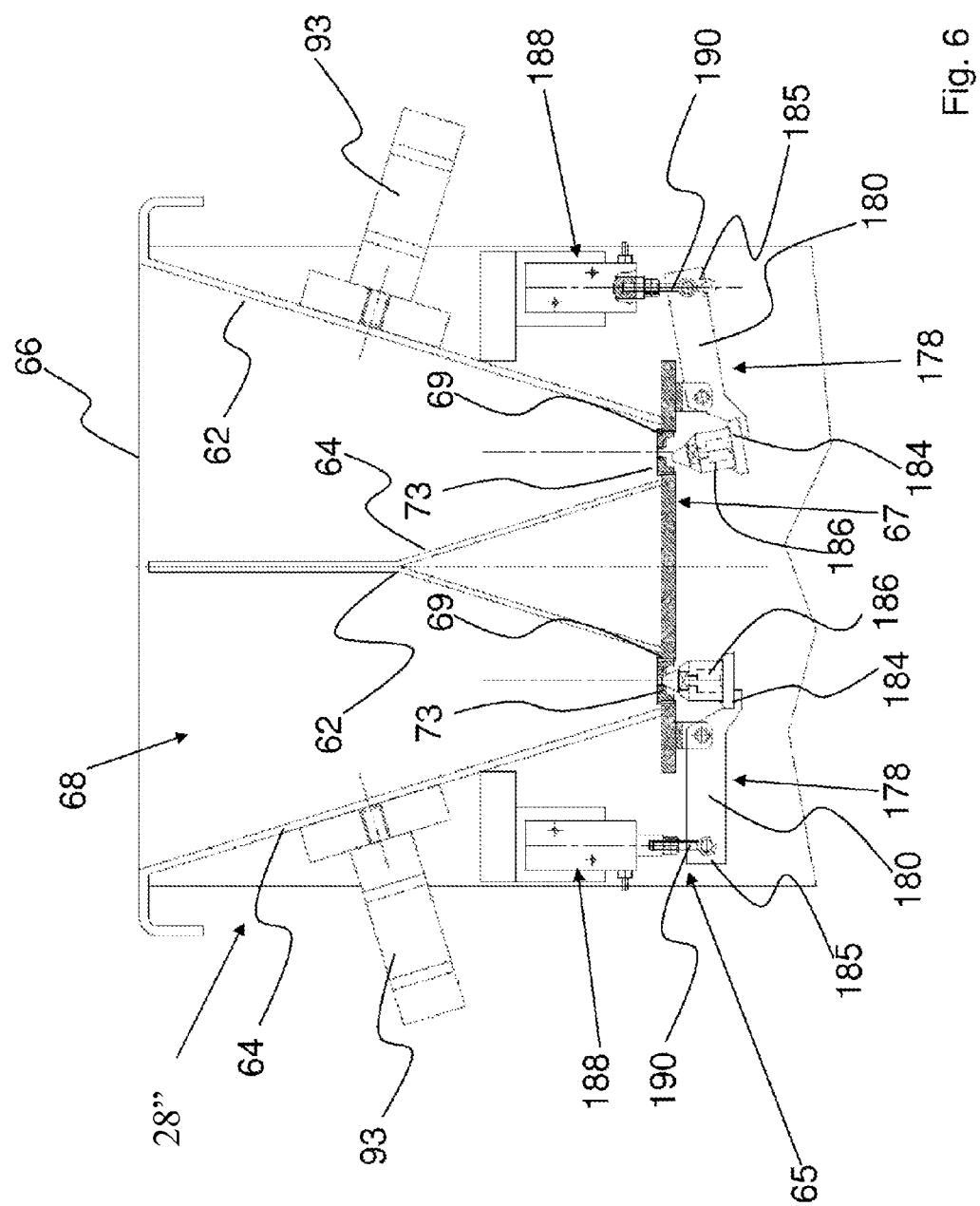
FIG. 6 shows a laterally sectioned view of an alternate embodiment of the dispensing device according to the invention.

With reference now to FIG. 6, an alternative embodiment of the dispensing device (referenced as 28") according to the invention is now described.

In this case it is envisaged using the abovementioned prism-shaped funnel 68 comprising a bottom wall 67.

The bottom wall 67 is provided with a plurality of holes 69 for allowing the powdery colouring substance to pass through from the funnel 68 to the spreading device 30 situated underneath.

Said holes 69 are present over the whole transverse extension of the apparatus in random positions so as to increase the random nature of metering of the colouring substance.

A bush 73 is inserted inside each hole 69 and acts as a through-fall orifice for the powdery colouring substance, the internal diameter of which may assume different values depending on the type and quantity of colouring substance to be dispensed.

Said bushes 73 have an external diameter which is the same as the internal diameter of the holes 69.

A device 65 for opening/closing the holes is associated with the bottom wall 67 and comprises at least one hinged opening/closing mechanism 178 associated with each hole 69 in the bottom wall 67.

The hinged opening/closing mechanism 178 comprises:

a lever 180 hinged at a middle point between the ends 184, 185;

a closing member 186 associated with the bush 73 for closing the hole 69 and connected to a first end 184 of the lever 180;

an actuator 188 for actuating the hinged mechanism 178, connected to a second end 185 of the lever 180.

The actuator 188 comprises in turn a linear electromagnet or an electromechanical device provided with a movable stem 190 hinged to the second end 185 of the lever 180.

In the rest position the stem 190 protrudes externally and is kept in this position owing to the resilient action exerted by a compressed spring (not shown) which pushes the stem towards the outermost position.

When the electromagnet is actuated, the stem 190 is retracted, compressing further the spring so that, as soon as the power supply is interrupted, the stem moves out again.

As shown in FIG. 6, in the rest position the actuator 188 closes off the hole 69 by means of the closing member 186.

When the electromagnet 186 is energized, the closing member 186 moves from the closed position.

Energization of the electromagnet is managed by a programmable control unit (not shown) so as to cause opening and closing of each hole 69 in a random and programmed manner as defined above.

In both embodiments described vibration-generating means 93 may be associated with the bottom or the inclined walls 64, 62 of each funnel 68, with the aim of assisting the flow of powdery colouring substance through the bushes 73.

Figure 5:
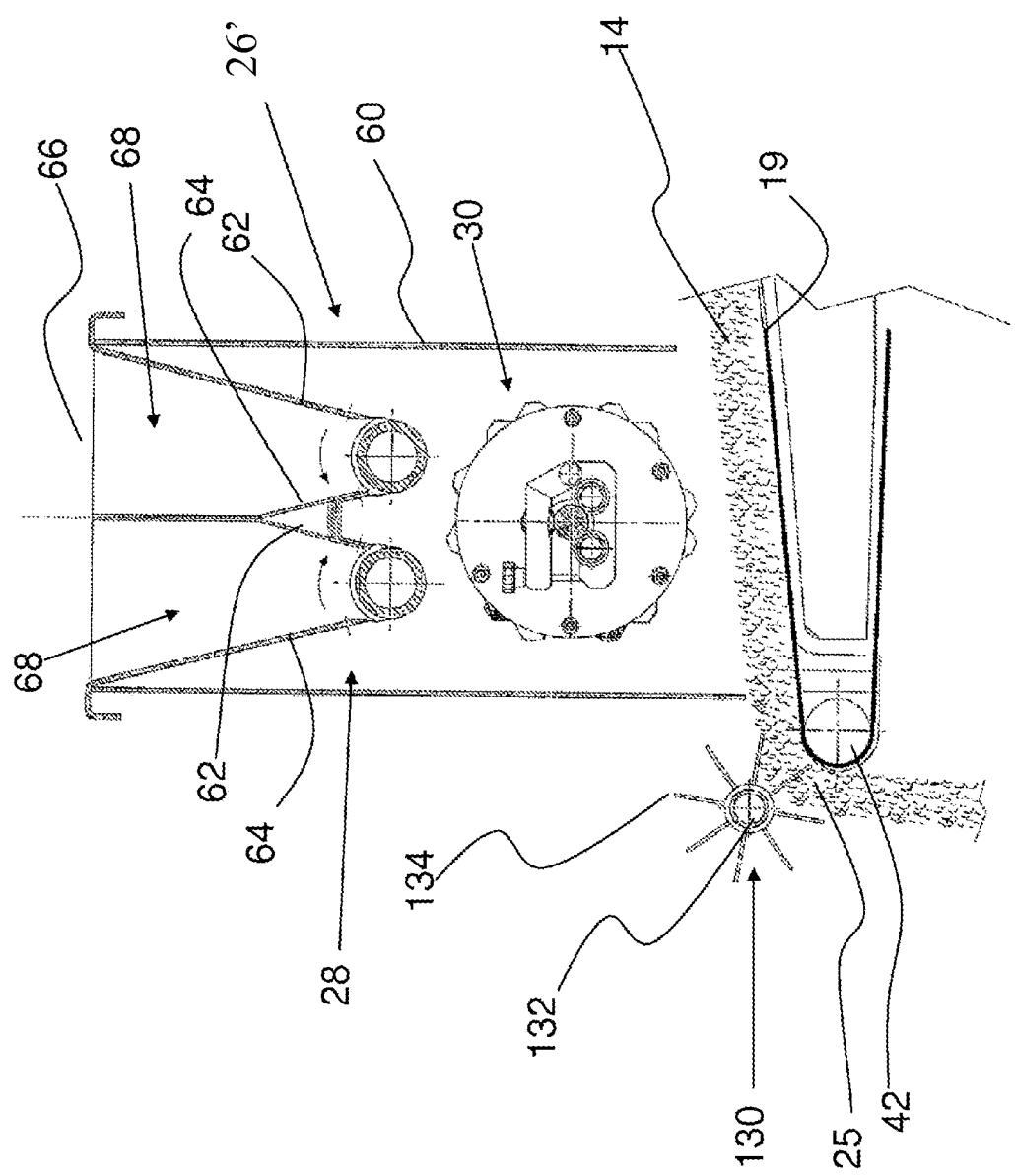
FIG. 5 shows a laterally sectioned view, on a larger scale, of the dispensing/spreading means for distributing the powdery colouring substance according to a second embodiment of the invention.
Figure 7:
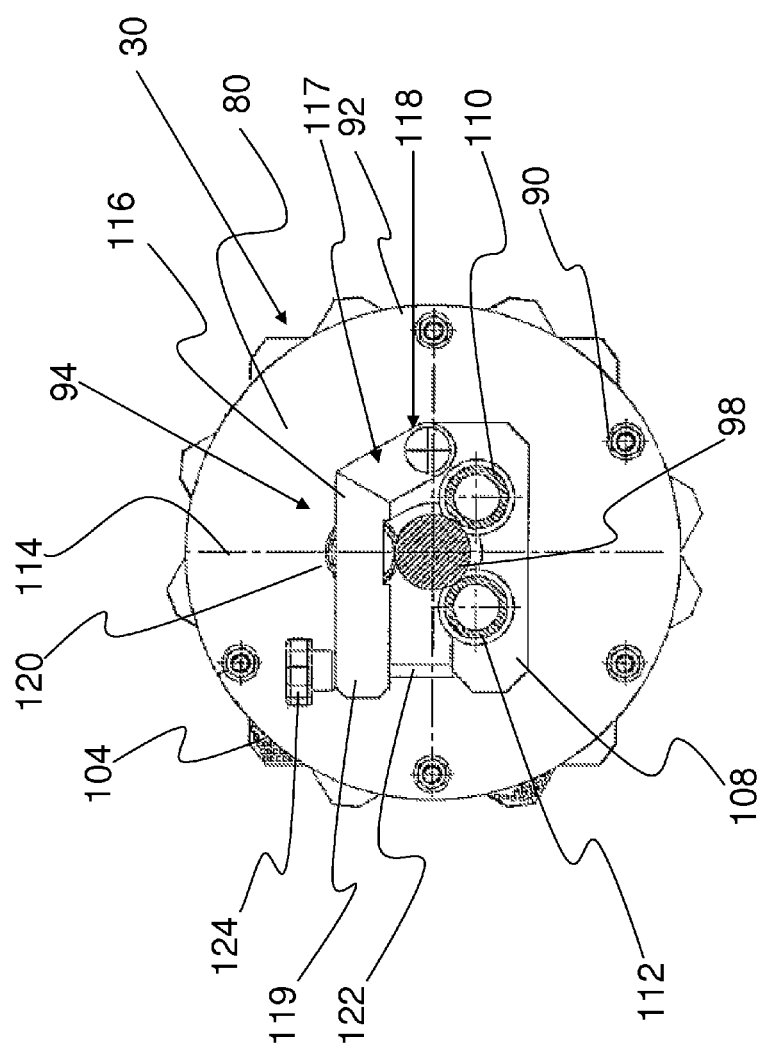
FIG. 7 shows a view from one end of the fixing device associated with the device for spreading the powdery colouring substance according to FIG. 1.
Figure 8:
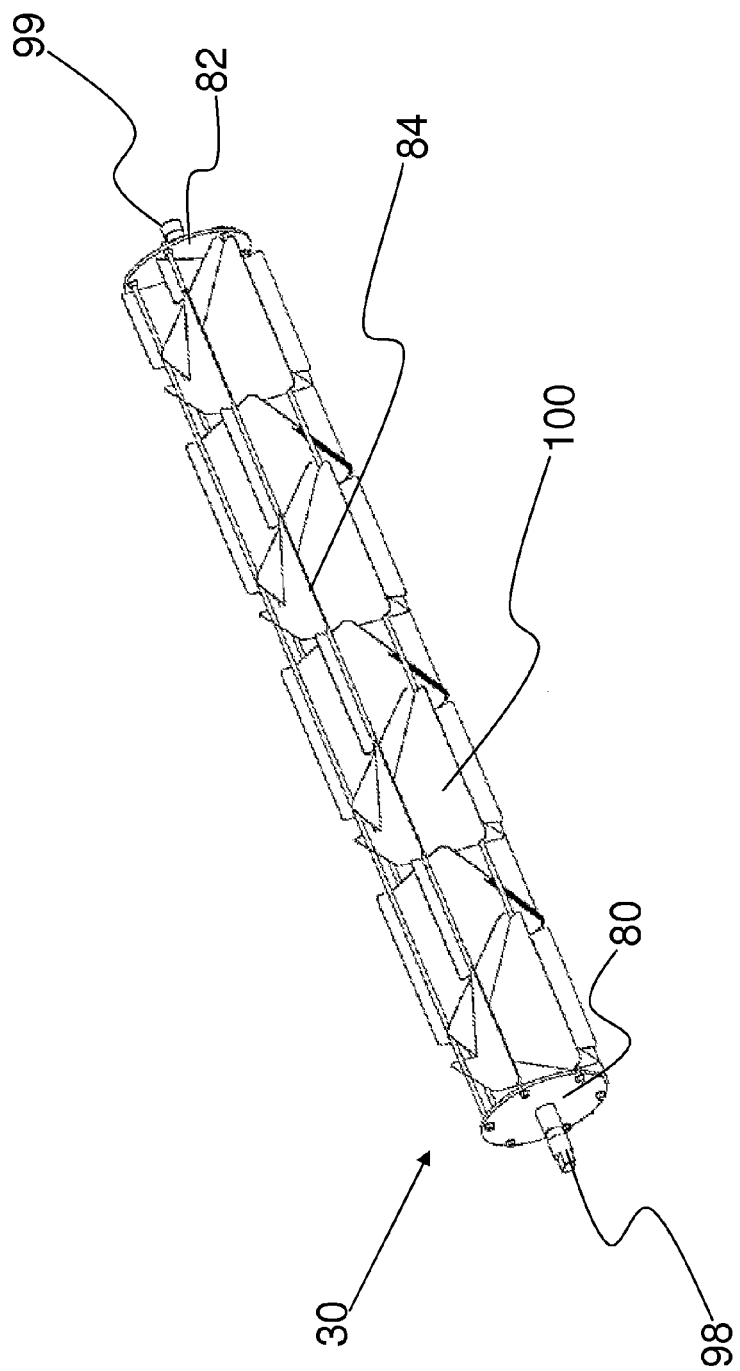
FIG. 8 shows a perspective view of the spreading device according to FIG. 1.

With reference now also to FIGS. 5, 7 and 8, the spreading device 30 is described in detail.

The spreading device 30 allows distribution and spreading, over the surface of the mix 14, of the powdery colouring substance 11 dispensed by the dispensing device 28, preferably in a position situated between the discharge opening 24 of the hopper 20 and the end 25 of the extractor belt 19.

According to a first embodiment the spreading device 30 comprises at least one moving perforated plate 100 positioned underneath the dispensing device 28 from which it receives a metered quantity of said colouring substance 11.

In particular the at least one plate 100 is able to move in a longitudinal transverse direction, vibrate or rotate about a transverse axis.

In a second embodiment the spreading device 30 is a rotating structure comprising a series of differently inclined perforated plates in an interlocking arrangement. In one particular constructional form the device 30 comprises two end flanges 80, 82 facing each other at a distance substantially equal to the width of the underlying layer of mix 14 conveyed by the extractor belt 19, i.e. in a direction perpendicular to the arrow FL.

A plurality of preferably metallic rods 84 connect the flanges 80, 82 together. The rods may be connected to the flanges 80, 82 in a non-permanent manner, for example by means a screw and nut system. In this case the end of the rod is provided with an external thread, and the flange 80 or 82 is provided with a through-hole from which the end of the rod projects and is engaged and locked with a nut 90.

In an alternative embodiment, the connection may be permanent in nature, for example by means of butt-welding of the ends of the rod 84 and flange 80 or 82.

The rods 84 are preferably positioned at the periphery of the flanges 80 or 82, in the vicinity of the peripheral edge 92 of the flange itself (see FIG. 7).

The cage-like structure thus formed occupies a substantially cylindrical volume and supporting and connection means in the form of cylindrical pins 98, 99 projecting towards the outside of said flanges 80, 82 are rigidly fixed to the outer sides of said flanges 80, 82. The pins 98, 99 are used for supporting the cage and for connection to motor means 95, shown in FIG. 10, able to cause rotation of the cage structure about its longitudinal axis. A plurality of plates, indicated by the overall reference number 100 in FIG. 8, are rigidly fixed onto the said cage structure. Said plates 100 are provided with holes 104 over the whole of their surface; for greater simplicity and clarity, the holes have not been shown in the accompanying figures, except in the case of FIG. 7, said holes 104 allowing the plates 100 to act as a "sieve" for the colouring powder 11 supplied by the dispensing means 28. The holes 104 have a diameter of about 2-5 mm.

Moreover, as can be understood in particular from FIG. 8, the arrangement of the plates 100 may be random and the plates 100 are inclined with respect to the main axis of the cage structure.

In particular, the plates 100 are connected to the cage structure by means of a weld performed on two rods 84 which are not consecutive and in a substantially diametral position.

Said plates 100 may be welded to the rods 84 both by means of a weld on their flat surface or by means of a weld along their thickness.

In an alternative embodiment it is envisaged using a single rod 84 arranged centrally on the cage structure and essentially connecting together the centres of the flanges 80, 82. The plates 100 are welded to this single rod 84 in the same manner as described above.

FIGS. 11 to 16 shows a possible sequence for assembly of the plates according to a possible embodiment.

According to this embodiment it is envisaged using three types of rectangular plate 140, 141, 142 and three types of triangular plate 143, 144, 145. "Types of plate" is understood as referring to plates with a different size, form and spatial orientation.

Figure 11:
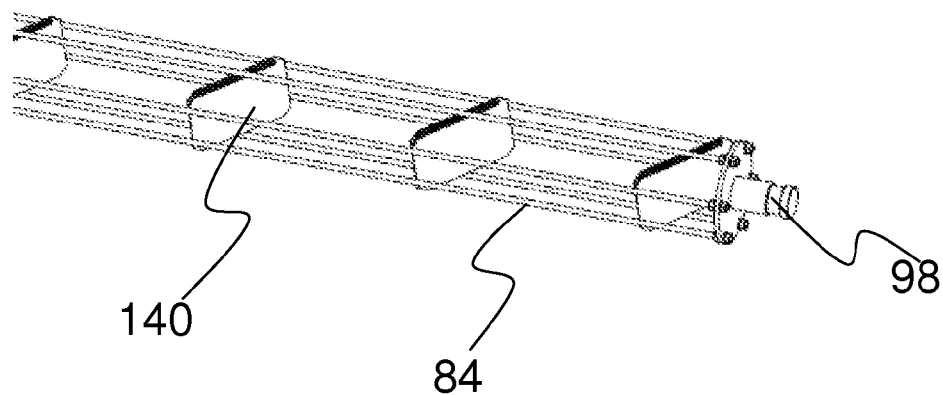
FIG. 11, FIG. 12, FIG. 13, FIG. 14, FIG. 15, FIG. 16 show a possible sequence of the stages for construction of the device for spreading colouring substance according to the invention.

FIG. 11 shows the cage structure with a first rectangular plate 140 which is welded to the rods 84 along its thickness. The first rectangular plate 140 is positioned in a direction substantially transverse, but inclined with respect to the main axis of the spreading device (30).

Figure 12:
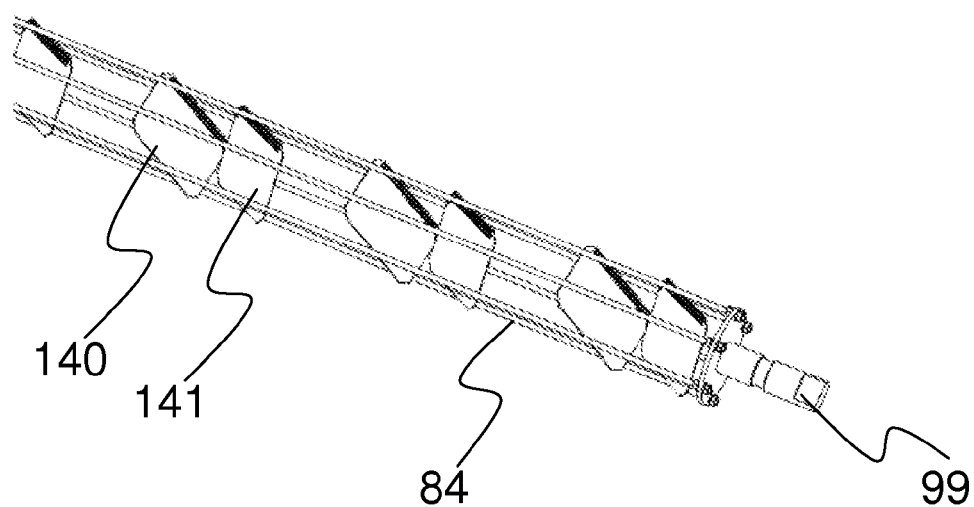

With reference now to FIG. 12, this also shows a second plate 141 which is also rectangular and welded to the rods 84 along its thickness. This second rectangular plate 141 is also positioned in a direction substantially transverse, but inclined in the opposite direction to the first rectangular plate 141 so that the first and second rectangular plates 140, 141 converge towards each other and towards the inside of the spreading device 30.

Figure 13:
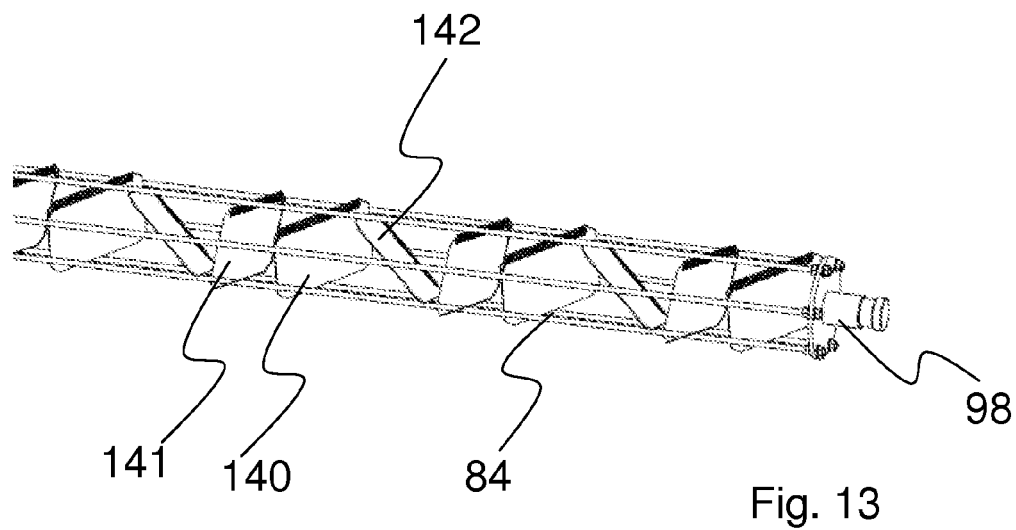

FIG. 13 shows the incorporation of a third rectangular plate 142 lying in a plane substantially transverse to said axis of said spreading device 30, but inclined with respect to the plane in which said first and second rectangular plates 140, 141 respectively lie. The plate 142 is also welded to the rods 84 by means of welds provided along their thickness.

Figure 14:
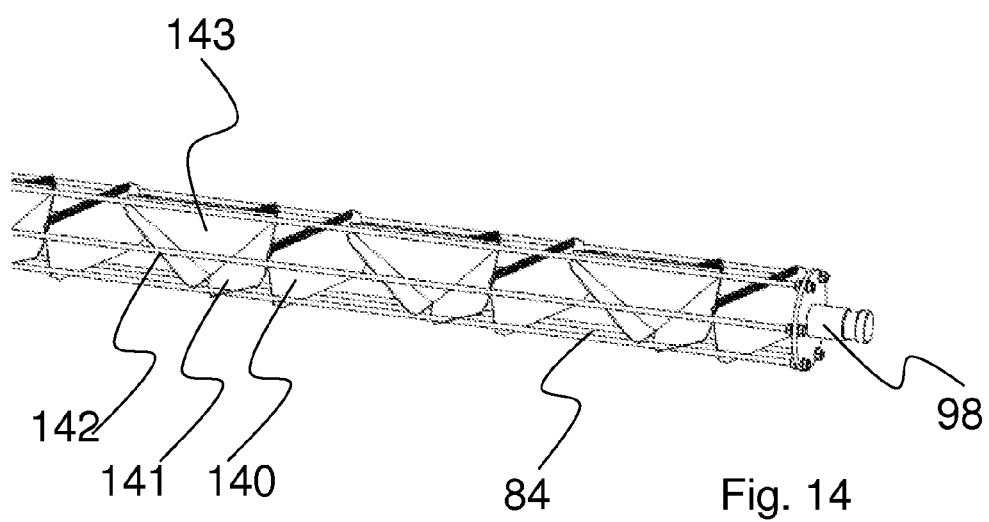

With reference to FIG. 14, this shows the incorporation of a first triangular plate 143 in a position situated between the two plates 141 and 142, being in a position substantially parallel to the main axis of the cage structure. The plate 143 has its edges welded to the plates 141 and 142 and its base directed towards the outside of the cage structure and the opposite vertex directed towards the centre thereof.

Figure 15:
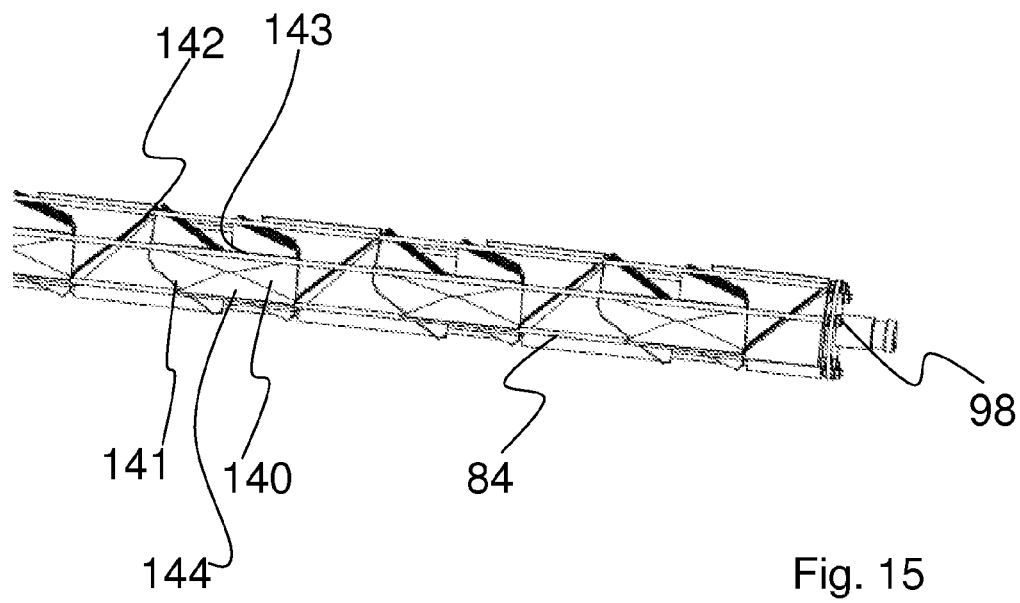

FIG. 15 shows the structure according to FIG. 14 with a second triangular plate 144 welded parallel to the main direction of the cage structure. Like the plate 143 it is welded to the plates 141 and 142 parallel to the main direction of the cage structure, but in a plane different from that of the plate 143.

Figure 16:
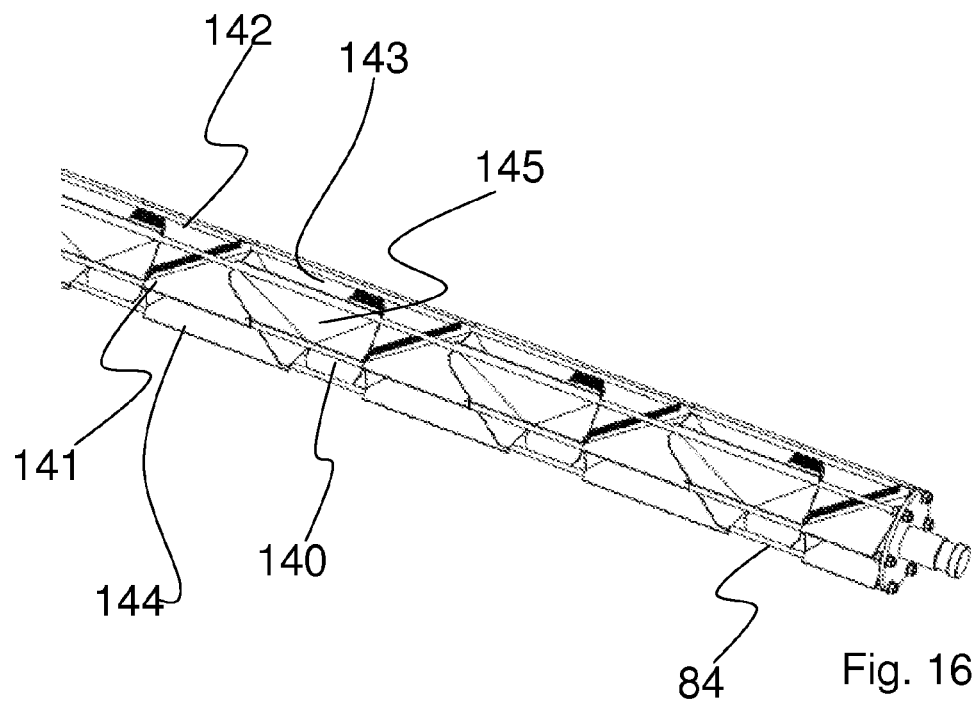

FIG. 16 shows the complete structure of the spreading device 30 with also the third triangular plate 145. The plate 145 is welded in a manner similar to that of the previous triangular plates in particular between the rectangular plates 140 and 141.

FIG. 7 shows a system for supporting and locking the spreading devices 30 to the structure of the apparatus 12, 12', denoted overall by the reference number 94.

The support and locking system 94 extends substantially in the transverse plane defined above. In particular, the locking system 94 comprises:
- a fixed bracket 108 rigidly fixed to the structure of the apparatus 12, 12' on which two idle support wheels 110, 112 for rotatably supporting the pin 98 are mounted;
- a lever 116 with a first end 117 having a hinge 118 at one end of the fixed bracket 108; an idle locking wheel 120 in contact with the pin 98 is mounted on said elbow lever 116; in particular, in the operating or closing position, said wheels 110, 112 and 120 are located at the vertices of a triangle; and
- a second end 119 of the elbow lever 116 can be fixed to the bracket 108 by means of threaded pin 122 rotatable by means of a knob 124.

Figure 9:
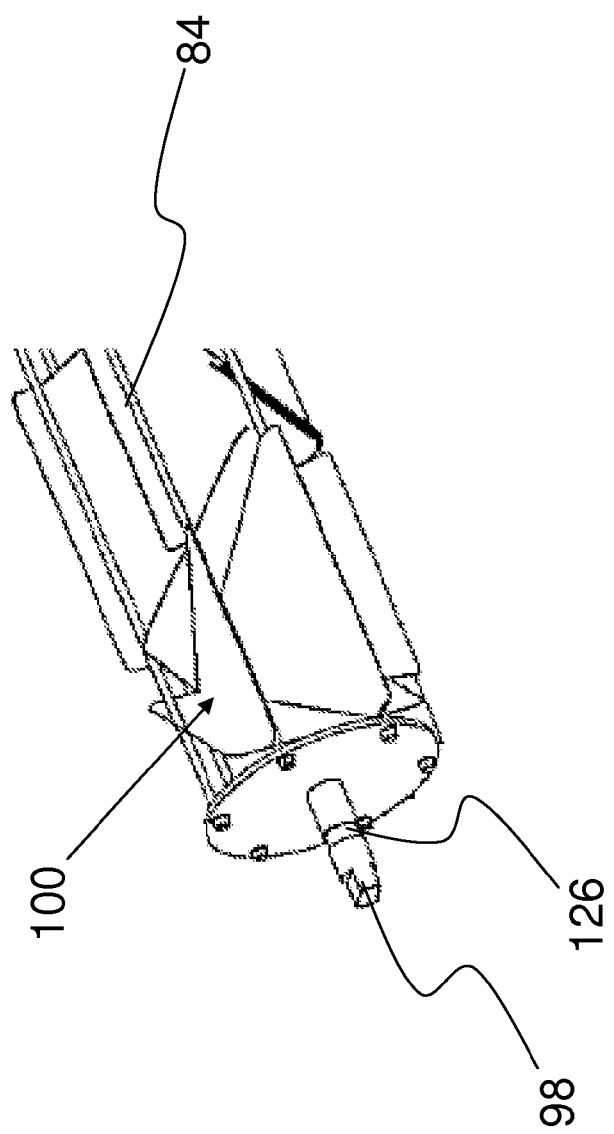
FIG. 9 shows a perspective view of a detail of the spreading device according to FIG. 8.

As shown in FIG. 7, said wheels 110, 112 and said wheel 120 engage with a circumferential groove 126 (see FIG. 9) formed on the pin 98 for supporting and axially locking the cylindrical cage 30, preventing displacements in the axial direction.

Preferably, the apparatus 12, 12' according to the invention at the end 25 of the extractor belt 19 comprises a fragmenting device or roller denoted overall by the reference number 130. Please amend paragraph on page 11, starting on line 6 and ending on line 8, as follows:

With reference to FIG. 5, said fragmenting roller comprises a support shaft 132 having its ends fixed to the structure of the apparatus 12, 12' so as to allow rotation about the axis of the shaft 132.

A plurality of pins 134 which may also be of varying length project radially from the shaft 132.

The shaft 132 is rotated by a motor 133 (shown in FIG. 10) so that the pins 134 penetrate into the mix 14, helping the previously distributed powdery colouring substance 11 penetrate into the mix 14, and breaking up the mix into lumps with a size depending on the length of the pins 134.

According to a possible embodiment of the present invention, in order to increase the random nature of the veining and therefore produce a finished product which is as similar as possible to natural stone, several dispensing devices 28 and several spreading devices 30 may be provided, as shown in FIGS. 1, 2, 3 and 5.

Solutions are therefore envisaged where the dispensing devices 28 and spreading devices 30 are several in number and in particular without there being necessarily a direct relation between their number.

Moreover said devices 28, 30 may also be installed with their longitudinal axis not parallel to the transverse axis of the apparatus.

The operating principle of the apparatus 12, 12' according to the invention is now described in detail.

The initial configuration of the apparatus 12, 12' is that where the mix distributor 18 is empty, i.e. does not contain any mix 14.

The hopper 20 is then filled via the opening 22, while the gate 27 is closed so as to prevent the hopper 20 from emptying.

When the hopper 20 contains a suitable amount of mix, the gate 27 is opened and at the same time the motor-driven carriage structure 50 is operated. The relative speed of the tray 16 and the distributor 18 varies depending on the density of the mix distributed on the extractor belt.

The extractor belt 19 operated by the motor 41, forming the bottom of the hopper 20, causes feeding of the mix 14 in the direction of the discharge opening 24 and then the end 25 of the extractor belt 19. In view of the raised position of the extractor belt 19 situated above the tray 16, the mix falls into the tray 16 when it reaches the end 25 of the extractor belt 19. The controlled speed of displacement of the distributer 18 with respect to the tray 16 allows deposition of a layer with a constant mass.

In the method according to the invention a powdery colouring substance with a particle size normally less than 0.5 mm is added, using the dispensing/spreading means 26, 26' for distributing the powdery colouring agent 11 preferably between the discharge opening 24 of the hopper 20 and the end 25 of the extractor belt 19.

As already described, in a first embodiment, the colouring substance 11 is loaded into the at least one prism-shaped funnel 68 and accumulates above the dispensing cylinder 74.

The bottom part of the prism-shaped funnel is formed by flexible strips 70, 72 in contact with the dispensing cylinder 74.

The recesses 76, 78 provided on the cylinder 74 are filled with colouring substance 11 when they face the inside of the funnel 68.

Dispensing of the powdery colouring substance is performed by means of rotation, about its axis, of the dispensing cylinder 74 so that the recesses 76, 78, moving until they communicate at least partially with the part of the means 30 situated underneath the cylinder 74, allow their contents to fall out.

The flexible strips 70, 72 control and favour discharging of the colouring agent onto the successive spreading devices 30, distributing the colouring substance in a random manner.

In this way the dispensing device 28 distributes in a random manner the colouring substance 11 above the spreading device 30.

Moreover, in accordance with the second embodiment of the dispensing device 28 shown in FIG. 6, the control unit (not shown) manages the actuators 187 and 188 so that the powdery colouring substance covers in a random and programmable manner the surface of the spreading device 30.

The control unit also manages the duration of opening and/or closing of the holes 69, 71 by the closing members 196, 186 and the rotation of the spreading devices 30, adjusting their speed.

According to a further embodiment, the control unit (not shown) may manage rotation of the dispensers 28 and rotation of the spreaders 30, adjusting their speed.

The spreading devices 30, described previously, in view of their configuration, allow the powdery colouring substance to pass through the holes 104.

In particular they are imparted a movement and are positioned underneath the dispensing device 28 from which they receive a metered quantity of said colouring substance 11.

In an alternative embodiment the spreading device 30 is imparted a continuous or discontinuous alternating movement.

In this way it is therefore possible to distribute the powdery substance 11 randomly over the whole of the mix 14 passing beneath the spreading device.

It is understood that the present invention is applicable to the structures of known machines and in particular it is understood that the present apparatus and the present method are applicable both to Bretonstone technology and to Lapitech technology.

With regard to the embodiments described above, the person skilled in the art may, in order to satisfy specific requirements, make modifications to and/or replace elements described with equivalent elements, without thereby departing from the scope of the accompanying claims.

The invention claimed is:

1. Dispensing/spreading means for dispensing a powdery colouring substance onto a surface of a mix comprising stone, stone-like, glass or ceramic material,
    said means comprising at least one dispensing device designed to contain and dispense a powdery colouring substance and;
    at least one spreading device having at least one moving perforated plate which receives a metered quantity of said colouring substance from said dispensing device and distributes said substance over the surface of the mix;
    wherein said at least one spreading device comprises:
        two end flanges facing each other;
        a plurality of rods which connect together the flanges and are positioned in a vicinity of a peripheral edge of the end flanges so as to form a cylindrical cage, the at least one perforated plate connected to the plurality of rods; and
        means for connecting at least one of said end flanges to motor means for performing rotation of said rods and in turn the at least one perforated plate about a main axis of said cylindrical cage.

2. Apparatus for distributing in a thin layer a mix comprising stone or ceramic material on an underlying support, comprising:
    a mix distributor in a form of a hopper having:
        a top opening for loading the mix bounded by side walls, one of the side walls being shaped with a profile which is convex towards an inside of the hopper; and
        an opening for discharging the mix, defined by a bottom end of said one shaped side wall and by an extractor belt positioned below said hopper, a bottom of the hopper being formed with an upper side of the extractor belt, the belt being operated so as to deposit a uniform layer of said mix after the mix has flowed inside the hopper and has passed out through said discharge opening onto said support while a relative movement of said hopper and said underlying support is maintained so as to obtain a uniform layer of mix on said underlying support, said support being positioned at a lower level than said extractor belt; and
    dispensing/spreading means for distributing a powdery colouring substance over a surface of the mix, said means being designed to sprinkle the powdery colouring substance onto the mix in a position situated between the discharge opening of the hopper and an end of the extractor belt where discharging of the mix onto the support occurs;
    wherein said dispensing/spreading means comprise at least one dispensing device and at least one spreading device;
    said at least one spreading device associated with said at least one dispensing device so as to comprise at least one rotating perforated plate positioned and rotatable below the at least one dispensing device and which receives a metered quantity of said powdery colouring substance from said at least one dispensing device and distributes the powdery colouring substance over a surface of the mix.

3. The apparatus according to claim 2, wherein the at least one dispensing device is configured to contain and dispense the powdery colouring substance.

4. The apparatus according to claim 2, wherein said dispensing/spreading means comprises a support and locking system comprising:
    a fixed bracket rigidly fixed to structure of the apparatus on which two idle support wheels rotatably seating a pin are mounted; and
    an elbow lever having:
        a first end hinged at one end of the fixed bracket, an idle wheel being mounted on said elbow lever; and
        a second end of the elbow lever fixed to the fixed bracket by means of a threaded pin rotatable by means of a knob.

5. The apparatus according to claim 2, further comprising a fragmenting roller positioned at the end of the extractor belt and comprising a support shaft having ends fixed to structure of the apparatus and rotated by an electric motor, a plurality of pins projecting radially from said shaft.

6. Method for distributing in a thin layer a mix based on one or more of stone or ceramic material and a binder on a support, comprising the steps of:
    distributing a mix on an extractor belt, said mix being contained in a mix distributor in a form of a hopper, the mix distributor having:
        a top opening for loading the mix bounded by side walls, one of the side walls being shaped with a profile which is convex towards an inside of the hopper;
        an opening for discharging the mix, defined by a bottom end of said one shaped side wall and by an extractor belt positioned below said hopper, a bottom of the hopper being formed with an upper side of the extractor belt;
    distributing a powdery colouring substance over a surface of the mix in a position situated between the discharge opening of the hopper and one end of the extractor belt where discharging of the mix onto the support occurs, using dispensing/spreading means, said means designed to sprinkle the powdery colouring substance onto the mix; and
    depositing a uniform layer of the mix after the mix has flowed inside the hopper and has passed out through said discharge opening by means of falling thereof from the one end of the extractor belt onto the support while a relative movement of said hopper and said underlying support is maintained so as to obtain the uniform layer of mix on said underlying support, said support being positioned at a lower level than said extractor belt;
    wherein said dispensing/spreading means comprises at least one dispensing device and at least one spreading device;
    said spreading device associated with said at least one dispensing device so as to comprise at least one rotating perforated plate positioned and rotatable below the at least one dispensing device, from which the plate receives a metered quantity of said powdery colouring substance and distributes the quantity over a surface of the mix.

7. The method according to claim 6, wherein the powdery colouring substance has a particle size of less than 0.5 mm.

8. The apparatus according to claim 2, wherein said at least one dispensing device comprises:
two inclined walls which converge downwards so as to form a prism-shaped funnel;
flexible metal strips fixed to the inclined walls; and
a metering cylinder which:
forms the bottom of the prism-shaped funnel;
is kept in contact with the metal strips;
is rotated about an axis of the metering cylinder by a motor; and
has on a surface of the metering cylinder a plurality of recesses.

9. The apparatus according to claim 8, wherein said plurality of recesses of the metering cylinder are arranged in positions which are non-symmetrical with respect to the axis of the metering cylinder and in positions distributed in a non-ordered manner along a direction of the metering cylinder axis, said plurality of recesses having a variable circumferential and longitudinal extension and variable depth.

10. The apparatus according to claim 2, wherein said at least one dispensing device comprises:
two inclined walls which converge downwards so as to form a prism-shaped funnel;
a bottom wall which closes said funnel and having a plurality of holes for allowing the powdery colouring substance to pass through; and
an opening/closing device associated with said plurality of holes.

11. The apparatus according to claim 10, wherein concentric bushes are associated with said plurality of holes, forming further fall-through orifices for the powdery colouring substance.

12. The apparatus according to claim 11, wherein said at least one dispensing device for opening/closing said plurality of holes comprises at least one hinged opening/closing mechanism.

13. The apparatus according to claim 12, wherein said hinged opening/closing mechanism comprises:
a lever hinged at a middle point between ends of the lever;
a closing member associated with each of the concentric bushes for closing the plurality of holes and connected to first ends of the levers;
an actuator for actuating the hinged opening/closing mechanism, connected to a second end of the lever and having a stem movable between a position for opening and a position for closing the plurality of holes.

14. The apparatus according to claim 12, wherein said device for opening/closing the plurality of holes is operated by a programmable control unit.

15. The apparatus according to claim 8, further comprising vibration generating means associated with the inclined walls or bottom of the prism-shaped funnel.

16. The apparatus according to claim 2, wherein said at least one spreading device comprises:
two end flanges facing each other;
a plurality of rods which connect together the flanges and are positioned in a vicinity of a peripheral edge of the end flanges so as to form a cylindrical cage, the at least one perforated plate connected to the plurality of rods; and
means for connecting at least one of said end flanges to motor means for performing rotation of said rods and in turn the at least one perforated plate about a main axis of said cylindrical cage.

17. The apparatus according to claim 16, wherein said at least one perforated plate of the at least one spreading device comprises a plurality of perforated plates connected to the plurality of rods, comprising:
a first rectangular plate positioned in a direction substantially transverse, but inclined with respect to a main axis of the at least one spreading device;
a second rectangular plate positioned in a direction substantially transverse, but inclined in an opposite direction to the first rectangular plate so that the first and second rectangular plates converge towards each other and towards an inside of the at least one spreading device;
a third rectangular plate lying in a plane substantially transverse to said main axis of said at least one spreading device, but inclined with respect to a plane in which said first and second rectangular plates lie;
first and second triangular plates which are positioned in a position situated between the first and second rectangular plates, each lying in a plane parallel to the main axis of the at least one spreading device; and
a third triangular plate positioned between the first rectangular plate and the second rectangular plate.

18. The apparatus according to claim 16, wherein said at least one perforated plate of the at least one spreading device comprises a plurality of perforated plates and wherein said at least one spreading device comprises:
end flanges connected together by one of the rods positioned in a central position with respect to the end flanges;
means for connecting at least one of said flanges to motor means for performing rotation of said spreading device about the main axis of said cylindrical cage; and
the plurality of perforated plates connected rigidly to one or more of each other and the rods.

19. The apparatus according to claim 2, wherein said at least one rotating perforated plate of the at least one spreading device performs a continuous or discontinuous alternating movement.

20. The apparatus according to claim 2, wherein said at least one rotating perforated plate during rotation remains below the at least one dispensing device.

* * * * *